United States Patent [19]
Chung

[11] Patent Number: 5,509,604
[45] Date of Patent: Apr. 23, 1996

[54] CHARGEABLE FAN HEATER

[75] Inventor: Woo S. Chung, Seoul, Rep. of Korea

[73] Assignee: Goldstar Co., Ltd., Seoul, Rep. of Korea

[21] Appl. No.: 111,329

[22] Filed: Aug. 24, 1993

[30] Foreign Application Priority Data

Aug. 26, 1992 [KR] Rep. of Korea ................. 1992-16111

[51] Int. Cl.$^6$ ................................ B60H 1/02; F24D 1/04
[52] U.S. Cl. ..................................... 237/12.1; 237/12.3 A
[58] Field of Search ...................... 237/12.1, 13, 12.3 A, 237/12.3 C

[56] References Cited

U.S. PATENT DOCUMENTS

| | | | |
|---|---|---|---|
| 2,410,353 | 10/1946 | McCollum | 237/12.1 |
| 3,858,802 | 1/1975 | Stobart | 237/12.1 |
| 4,240,581 | 12/1980 | Fowler | 237/12.1 |
| 4,291,834 | 9/1981 | Palazzetti et al. | 237/12.1 |
| 4,353,348 | 10/1982 | Black | 237/12.1 |

Primary Examiner—Henry A. Bennet
Assistant Examiner—Susanne C. Tinker
Attorney, Agent, or Firm—Spencer & Frank

[57] ABSTRACT

This invention relates to a chargeable fan heater capable of operation without external power supply, having a burner for burning fuel to produce hot combustion gas, a sterling engine having a shaft and for producing shaft works by the thermal energy from the hot combustion gas, a fan for discharging the hot combustion gas to spaces to be heated, a combined motor-generator connected to the sterling engine and for supplying shaft works to the shaft in starting of the fan heater and generating electricity by the shaft works of the sterling engine during normal operation of the fan heater after starting, a battery for supplying power to the combined motor-generator and being charged by the electricity generated in the combined motor-generator, and a control box for controlling the supply of power to the electric parts of the fan heater necessary for operation of the fan heater, burning of the burner and, the combined motor-generator to act as a motor in starting and as a generator after starting, of the fan heater.

5 Claims, 2 Drawing Sheets

5,509,604

CHARGEABLE FAN HEATER

FIELD OF THE INVENTION

This invention relates to a fan heater, more particularly to a chargeable fan heater capable of operation without external power supply.

As shown in FIG. 1, a conventional fan heater blowing combustion gas generated by combustion of fuel or the air heated through a heat exchanger, includes a control box 6, a burner 2 controlled by the control box 6, a fuel tank 1 supplying fuel to the burner 2 through a fuel supply line 3, an electric motor and a fan 5 driven by the electric motor to blow hot air to spaces to be heated.

BACKGROUND OF THE INVENTION

In such a kind of conventional fan heaters requiring external power supply, the operation is not possible on general power failure or in places of no power supply and restricted by the length of the electric cord.

SUMMARY OF THE INVENTION

The object of this invention is to provide a chargeable fan heater capable of operation with external power supply.

Another object of this invention is to provide a chargeable fan heater which can improve combustion efficiency by preheating supply air.

These and other objects can be achieved by providing a chargeable fan heater comprising a burner for burning fuel to generate combustion gas, a Stirling engine having a shaft and for producing shaft works from the thermal energy of the hot combustion gas, a fan for blowing the hot combustion gas to spaces to be heated, a combined motor-generator connected to the Stirling engine and, for supplying shaft works to the shaft in starting of the fan heater and generating electricity by the shaft works of the Stirling engine during normal operation of the fan heater, a battery for supplying power to the combined motor-generator and being charged by the electricity generated in the combined motor-generator and a control box for controlling the supply of power to the electric pans of the ran heater necessary for operation of the fan heater, burning of the burner and the combined motor-generator to act as a motor in starting and as a generator after starting, of the fan heater.

Further, a chargeable fan heater of this invention comprises a burner for burning fuel to generate combustion gas, a Stirling engine having a shaft and for producing shaft works from the thermal energy of the hot combustion gas, a fan for blowing the hot combustion gas to spaces to be heated, a combined motor-generator connected to the Stirling engine and, for supplying shaft works to the shaft in starting of the fan heater and generating electricity driven by the shaft works of the Stirling engine during normal operation of the fan heater, a blower operationally connected to the shaft of the Stirling engine and driven by the shaft works to supply necessary combustion air to the burner, a battery for supplying power to the combined motor-generator and being charged by the electricity generated for in the combined motor-generator and a control box for controlling the supply of power to the electric parts of the fan heater necessary for operation of the fan heater and burning of the burner and the combined motor-generator to act as a motor in starting and as a generator after starting, of the fan heater.

Further, the chargeable fan heater of this invention is provided with a duct led from the blower to the burner through the cooling part of the Stirling engine.

DETAILED DESCRIPTION.

Figure 1:
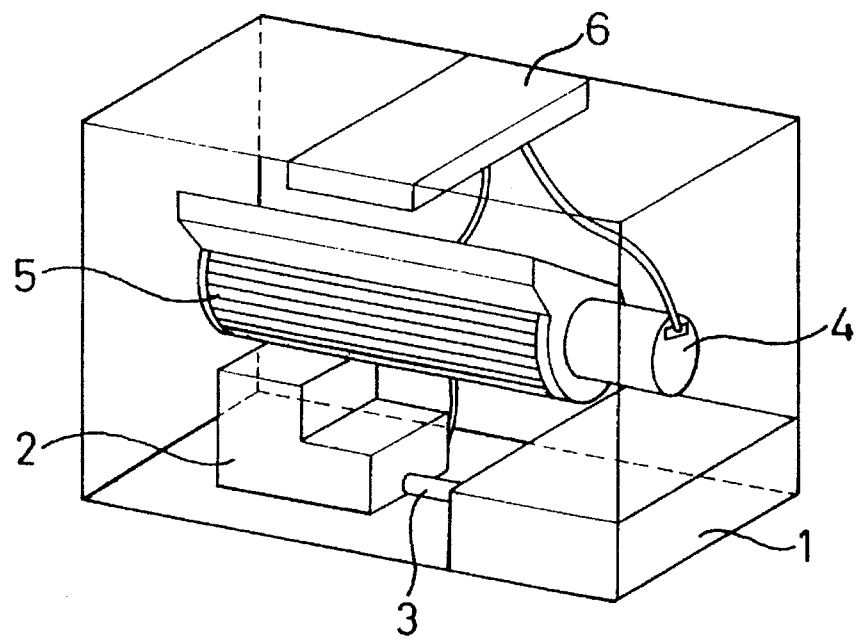
FIG. 1 is perspective view of a conventional fan heater showing the construction.
Figure 2:
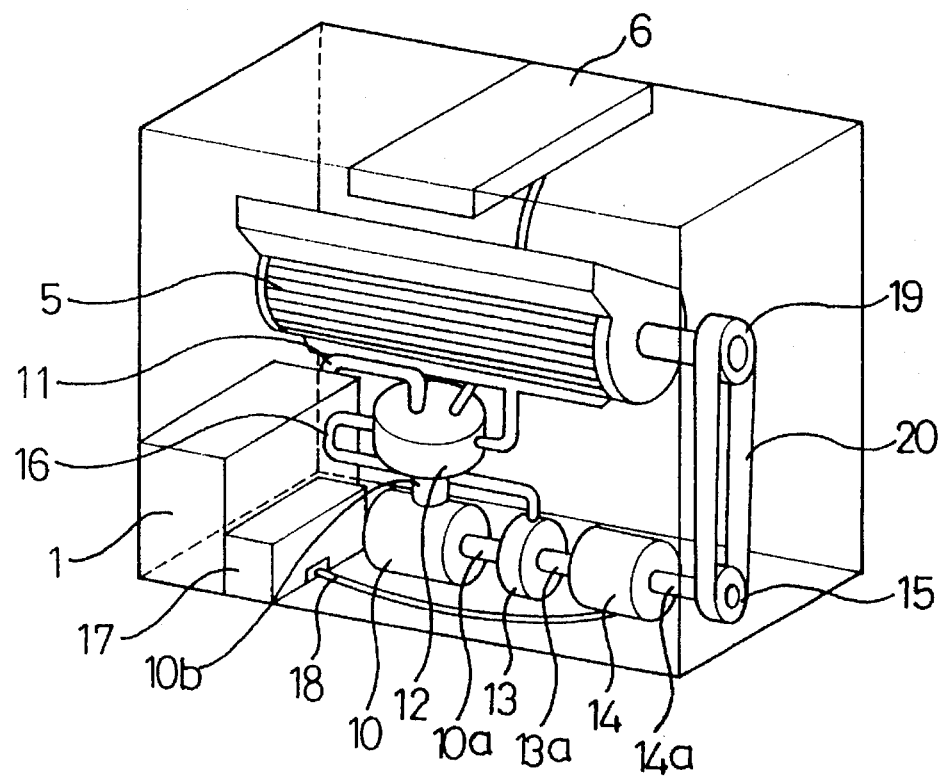
FIG. 2 is a perspective view of a fan heater of this invention showing the construction.

Shown in FIG. 2 is the construction of a fan heater of this invention, wherein a Stirling engine 10 producing shaft works from thermal energy rotates a shaft 10a.

A burner 12 connected with fuel thank 1 through a fuel pipe 11, burns fuel supplied from the fuel tank 1 to generate hot combustion gas and supply thermal energy to the Stirling engine.

A blower 13 of which shaft 13a is connected with the shaft 10a of the Stirling engine 10 is driven by the shaft works of the engine 10 and blow air to the burner 12.

An air duct 16 is led from the burner 12 to the blower 13 through a cooling part 10b of the Stirling engine 10.

A combined motor-generator 14 of which shaft 14a is connected to the shaft 13a of the blower 13, supplies shaft works to the shaft 10a of the Stirling engine in starting of the fan heater and generates electricity driven by the shaft works of the Stirling engine 10 during normal operation of the fan heater.

A fan 5 of which belt pulley 19 is connected to the belt pulley 15 of the combined motor-generator 14 through a belt 20, is driven by the shaft works of the Stirling engine 10 and blows the hot combustion gas produced by the burner 12 to spaces to be heated.

A battery 17 connected to the combined motor-generator 14 with a cable 18 is charged by the electricity generated by the combined motor-generator 14 and supplies power to the combined motor-generator 14.

A control box 6 controls burning of the burner, charging and discharging of the battery etc., ie the operation of the fan heater.

Figure 3:
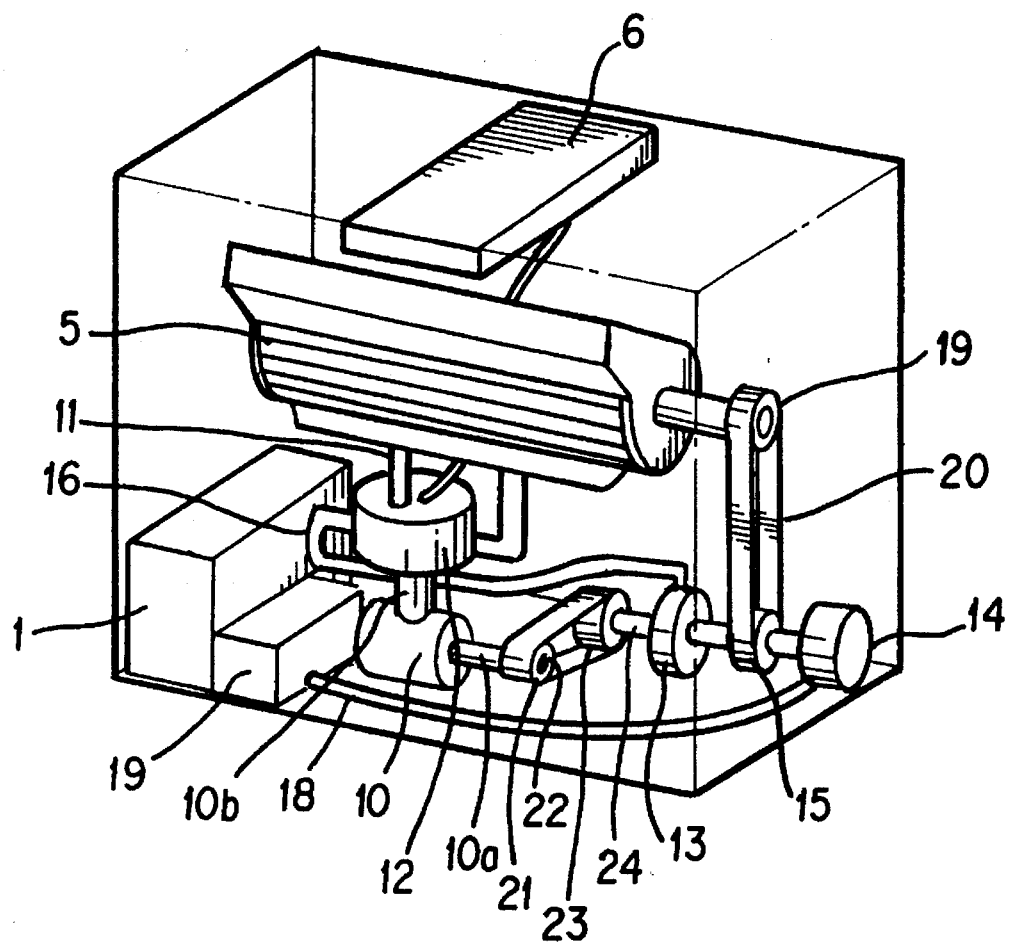
FIG. 3 is a perspective view of a fan heater of this invention showing additional features thereof.

In the meantime, though not illustrated in the drawing, the blower 13 and the fan 5 can be driven not by the shaft works of the Stirling engine 10 but by individual motors driven by the electricity from the battery 17 as shown in FIG. 3, the blower 13 and the motor-generator 14 can be operationally connected 23 to the shaft 10a with a parallel shaft 24.

The operation of the fan heater described above is explained hereinafter.

Upon pressing a starting button(not shown), the control box 6 controls the battery to supply power to the combined motor-generator 14 and the combined motor-generator 14 acting as a motor drives the Stirling engine 10, blower 13 and fan 5, thus starts the fan heater.

The burner 12, fuel being supplied from the fuel tank 1 through the fuel pipe 11 thereto and air being supplied by the blower 13 through the air duct 16 thereto, burns fuel and produces hot combustion gas to supply thermal energy produced by the combustion of fuel to the Stirling engine 10.

The Stirling engine 10 produces the shaft works from the thermal energy and the shaft works, in turn, transmits the energy to the blower 13 and the combined motor-generator 14 through the shaft 10 of the Stirling engine 10. The blower 13 driven by the shaft works blows necessary combustion air to the burner 12, the combined motor-generator 14 acting as a generator generates electricity to Charge the battery 17 and the fan 5 connected with the combined motor-generator 14 through the fan 5 belt pulley 19 and the combined motor-generator 14 belt pulley 15 and the belt 20 is driven by the transmitted shaft works to blow hot combustion gas to spaces to be heated.

Supply air to the burner 12 from the blower 13 through the air duct 16 led via the cooling part 10b of the Stirling engine 10, cools the Stirling engine 10 through exchange of heat with the cooling part 10b of the Stirling engine 10 before reaching to the burner 12 and is supplied to the burner 12 in preheated condition whereby the combustion efficiency of the burner is improved.

The electric energy charged in the battery 17 is used as an input energy to the combined motor-generator 14 to start the Stirling engine 10 in starting of the fan heater and as an energy necessary for the control box 6.

As explained hereinabove, according to the chargeable fan heater of this invention, thermal energy generated in the burner drives the Stirling engine, the Stirling engine producing shaft works drives the combined motor-generator to generate electricity, the generated electricity is charged to the battery and the charged electric energy in the battery is used as a necessary electric energy in starting of the Stirling engine and for the control box. Thus, the fan heater of this invention is operable even in general power failure or in case of power supply being impossible.

Further, combustion efficiency of the fuel in the burner can be improved because supply air to the burner is preheated in the cooling part of the Stirling engine.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A fan heater for at least one space comprising:

means for burning fuel to produce hot combustion gas;

means including a fan for moving a portion of the hot combustion gas to the space;

a Stirling engine powered by thermal energy from another portion of the hot combustion gas;

a shaft driven by the Stirling engine;

means including a motor-generator connected to said shaft for starting the Stirling engine and for generating electricity during normal operation of the fan heater after starting the Stirling engine;

means including a blower connected to said shaft for supplying necessary combustion air to said burning means;

means interconnecting said blower and said burning means and including a duct passing through a cooling part of the Stirling engine for preheating the combustion air supplied to said burning means by said blower;

means including a battery for supplying electrical power to the motor-generator to start the Stirling engine and for supplying electrical power to charge the battery during normal operation of the fan heater; and means for controlling said electrical power supplying means.

2. The heater of claim 1 further comprising a belt interconnecting said shaft and a fan shaft for driving said fan.

3. The heater of claim 1 wherein said blower and the motor-generator are coaxially connected to said shaft.

4. A fan heater for at least one space comprising:

means for burning fuel to produce hot combustion gas;

means including a fan for moving a portion of the hot combustion gas to the space;

a Stirling engine powered by thermal energy from another portion of the hot combustion gas;

a rotating shaft driven by the Stirling engine;

means including a belt interconnecting said shaft and a fan shaft for driving said fan;

means including a motor-generator coaxially connected to said shaft for starting the Stirling engine and for generating electricity during normal operation of the fan heater after starting the Stirling engine;

means including a blower coaxially connected to said shaft for supplying necessary combustion air to said burning means;

a duct passing through a cooling part of the Stirling engine for preheating the combustion air supplied to said burning means by said blower;

means including a battery for supplying electrical power to the motor-generator to start the Stirling engine and for supplying electrical power to charge the battery during normal operation of the fan heater; and means for controlling said electrical power supplying means.

5. The heater of claim 1, wherein said blower and said motor-generator are operationally connected to the shaft with a parallel shaft.

* * * * *